(12) United States Patent
Begg

(10) Patent No.: US 6,755,521 B1
(45) Date of Patent: Jun. 29, 2004

(54) CLIP-ON GLASSES ASSEMBLY AND ACTUATING MECHANISM THEREFOR

(75) Inventor: Robert G. Begg, Maple Ridge (CA)

(73) Assignee: 20/20 Marketing Ltd., Maple Ridge (CA)

( * ) Notice: Subject to any disclaimer, the term of this patent is extended or adjusted under 35 U.S.C. 154(b) by 0 days.

(21) Appl. No.: 10/616,927

(22) Filed: Jul. 11, 2003

(51) Int. Cl.[7] ................................................ G02C 9/00
(52) U.S. Cl. ............................ 351/48; 351/47; 351/128
(58) Field of Search .............................. 351/47, 48, 57, 351/58, 44, 41, 128, 124, 126

(56) References Cited

U.S. PATENT DOCUMENTS

| | | | |
|---|---|---|---|
| 5,477,281 A | * 12/1995 | Boyer | 351/128 |
| 5,710,614 A | 1/1998 | Cereda | 381/48 |
| 5,801,804 A | * 9/1998 | Pennise | 351/44 |
| 6,234,628 B1 | 5/2001 | Friedman | 381/48 |
| 6,302,538 B1 | 10/2001 | Friedman | 381/48 |
| 6,371,612 B1 | 4/2002 | Barrows | 381/48 |

* cited by examiner

*Primary Examiner*—Hung X. Dang
(74) *Attorney, Agent, or Firm*—Oyen Wiggs Green & Mutala

(57) ABSTRACT

A clip-on glasses assembly for mounting on primary glasses, comprising a pair of lens members, at least one grapple on each of the pair of lens members for engaging the outer edges of the primary glasses, and a bridge between the lens members configured to slidably receive the lens members to allow movement of the lens members between an open position and a closed position. An actuator bar having two ends, each end coupled to one of the lens members, allows a user to easily mount and remove the glasses assembly using only one hand. Moving the actuator bar toward the bridge forces the ends of the actuator bar apart and moves the lens members into the open position. The actuator bar is generally U-shaped and constructed from a resilient material. The actuator bar and/or separate springs bias the lens member toward the closed position. The bridge may further comprise a locking mechanism to maintain the lens members in the open position. An actuating mechanism comprising just the actuator bar can be affixed to other glasses assemblies to make those assemblies operable using only one hand.

16 Claims, 6 Drawing Sheets

CLIP-ON GLASSES ASSEMBLY AND ACTUATING MECHANISM THEREFOR

TECHNICAL FIELD

The invention relates to clip-on glasses such as sunglasses, and more particularly to a clip-on glasses assembly and an actuating mechanism for such an assembly permitting the clip-on glasses to be easily secured to and removed from primary glasses. More particularly, the invention relates to a novel actuating mechanism which allow a user to mount and remove clip-on glasses with one hand.

BACKGROUND

It is known to provide a pair of clip-on glasses with a spring-loaded bridge, so that frame engaging members, or grapples, on the outer edges of the lens members of the clip-on glasses bear against the outside of the frame or the outer edges of the lenses of a pair of primary glasses. Examples of clip-on glasses of this type are disclosed in U.S. Pat. No. 6,371,612 to Barrows, U.S. Pat. No. 6,302,538 and No. U.S. Pat. No. 6,234,628 to Friedman, and No. 5,710,614 to Cereda.

Clip-on glasses of the type described above may be mounted on and removed from primary glasses by grasping both lens members and pulling them apart, so that the primary glasses may fit between the grapples. Such an operation typically requires both hands of the user.

SUMMARY OF INVENTION

The invention provides a clip-on glasses assembly for mounting on primary glasses. The assembly comprises a pair of lens members, with at least one grapple on each of the pair of lens members for engaging the outer edges of the primary glasses. A bridge is coupled between the lens members, and configured to slidably receive the lens members to allow movement of the lens members between an open position wherein a space between the grapples is large enough to allow the clip-on glasses to be mounted on and removed from the primary glasses, and a closed position wherein the space between the grapples is small enough to prevent the clip-on glasses from being mounted on or removed from the primary glasses. Means for biasing the lens members toward the closed position are provided. An actuator bar having two ends is coupled to the lens members at its ends. Moving the actuator bar toward the bridge forces the ends of the actuator bar apart and moves the lens members into the open position.

The actuator bar is preferably generally U-shaped, and is more preferably constructed from a resilient material, thereby itself comprising the means for biasing the lens members toward the closed position.

Each lens member preferably comprises a slider bar attached to the top thereof, and the bridge preferably comprises a housing configured to slidably receive the slider bars at opposite ends thereof. Optionally, the means for biasing the lens members may comprise a spring attached between each slider bar and a portion of the housing; however, as mentioned, a resilient actuator bar may itself comprise the biasing means, whether alone or in combination with springs in the housing of the bridge.

The bridge may further comprise a locking mechanism for maintaining the lens members in the open position. The locking mechanism may comprise a lock bar and at least one biasing member configured to move the lock bar between the slider bars when the lens members are in the open position. The locking mechanism may further comprise a push button configured to extend through a correspondingly-sized aperture in the housing when the lock bar is between the slider bars.

The invention also provides a clip-on glasses assembly comprising a pair of lens members with at least one grapple on each of the pair of lens members, a bridge coupled between the lens members, the bridge configured to slidably receive the lens members to allow movement of the lens members between an open position wherein a space between the grapples is large enough to allow the clip-on glasses to be mounted on and removed from the primary glasses, and a closed position wherein the space between the grapples is small enough to prevent the clip-on glasses from being mounted on or removed from the primary glasses, means for biasing the lens members toward the closed position, and, a locking mechanism for maintaining the lens members in the open position.

The invention also provides an actuating mechanism for affixing to an existing clip-on glasses assembly to modify that assembly to enable it to be operated using only one hand. In particular, the actuating mechanism comprises an actuator bar having two ends, each end adapted for coupling to one of the lens members of the existing glasses assembly such that moving the actuator bar toward the bridge of the glasses assembly will force the ends of the actuator bar apart and move the lens members into the open position.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
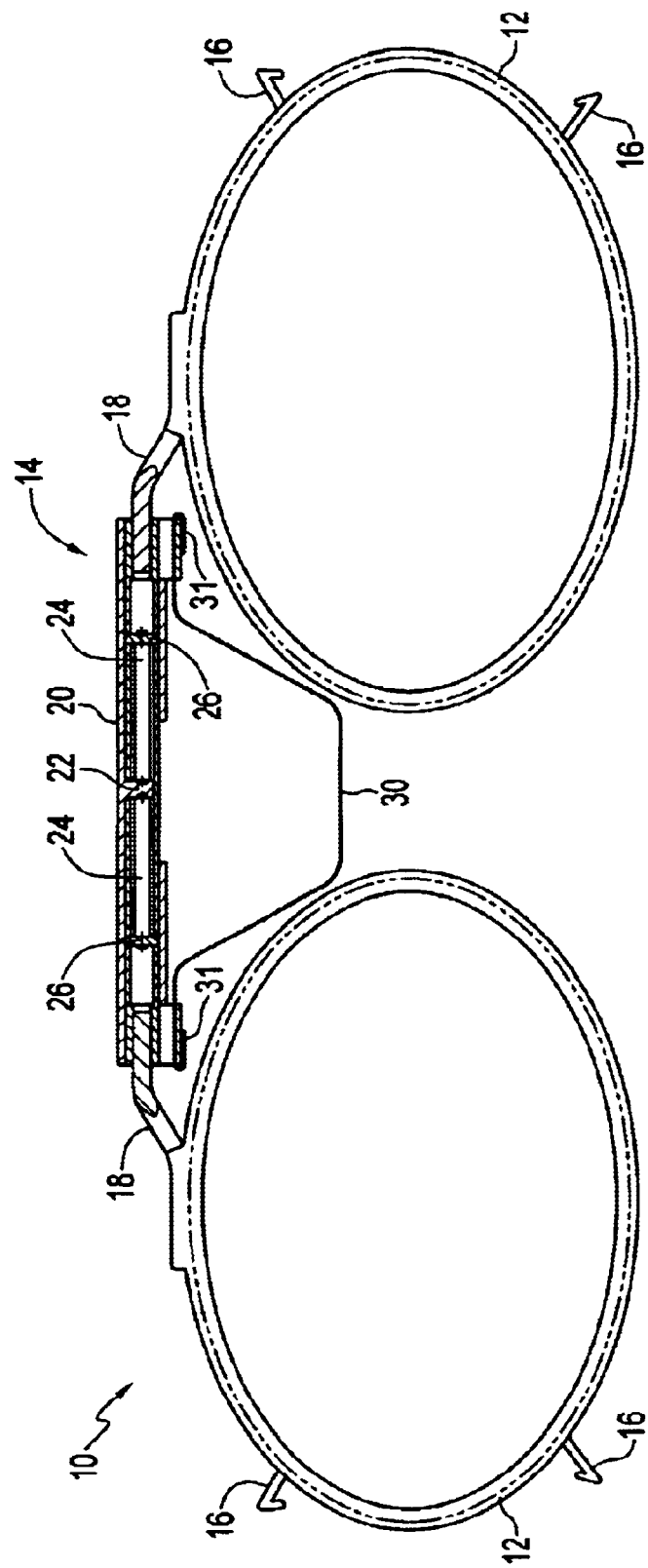
FIG. 1 is a partially sectional, front elevation view of a clip-on glasses assembly in a closed position, with an actuating mechanism according to an embodiment of the invention.
Figure 2:
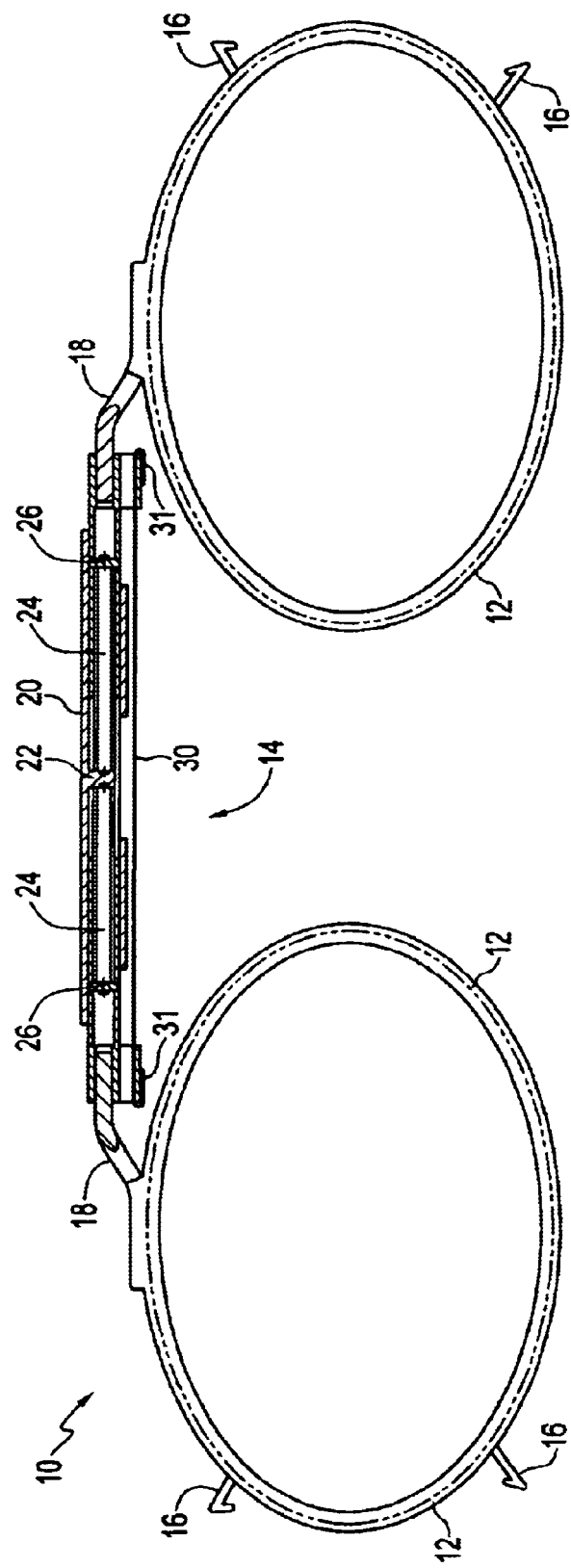
FIG. 2 is a partially sectional, front elevation view of the clip-on glasses assembly of FIG. 1 in an open position.
Figure 3:
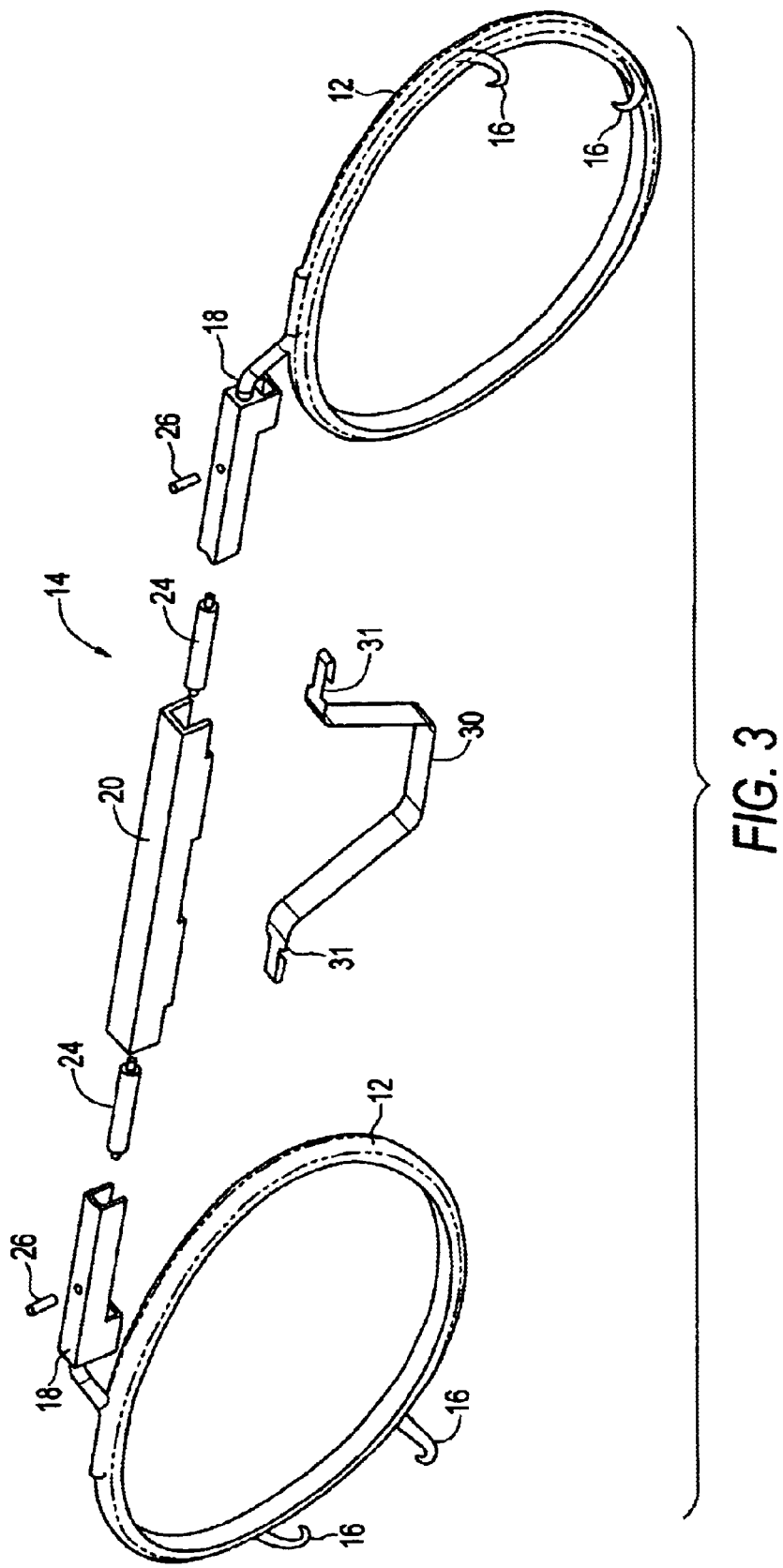
FIG. 3 is an exploded perspective view of the clip-on glasses assembly of FIG. 1.

FIGS. 1 to 3 show a clip-on glasses assembly 10 according to one embodiment of the invention. Glasses assembly 10 comprise a pair of lens members 12 connected by a bridge 14. Each lens member 12 may be fixed or interchangeable, full rim or rimless. Each lens member 12 has at least one grapple 16 thereon, configured to engage the outside of a lens member of a pair of primary glasses (not shown) onto which glasses assembly 10 may be mounted. Two grapples 16 are shown on each lens member 12 of the embodiment illustrated in FIGS. 1 to 3, but it is to be understood that the number of grapples 16 could be varied without affecting the invention, provided that at least one grapple 16, or equivalent, is provided for each lens member 12. A slider bar 18 is attached to the top of each lens member 12, and bridge 14 comprises a housing 20 with an opening at each end configured to slidably receive slider bars 18. In the embodiment illustrated in FIGS. 1 to 3, housing 20 has a central wall 22 to which springs 24 are attached, and each spring 24 is attached to one of slider bars 18 at its outer end by means of a pin 26. However, in a preferred embodiment, glasses assembly 10 and actuating mechanism therefor do not require the use of springs 24 or pins 26.

Figure 6:
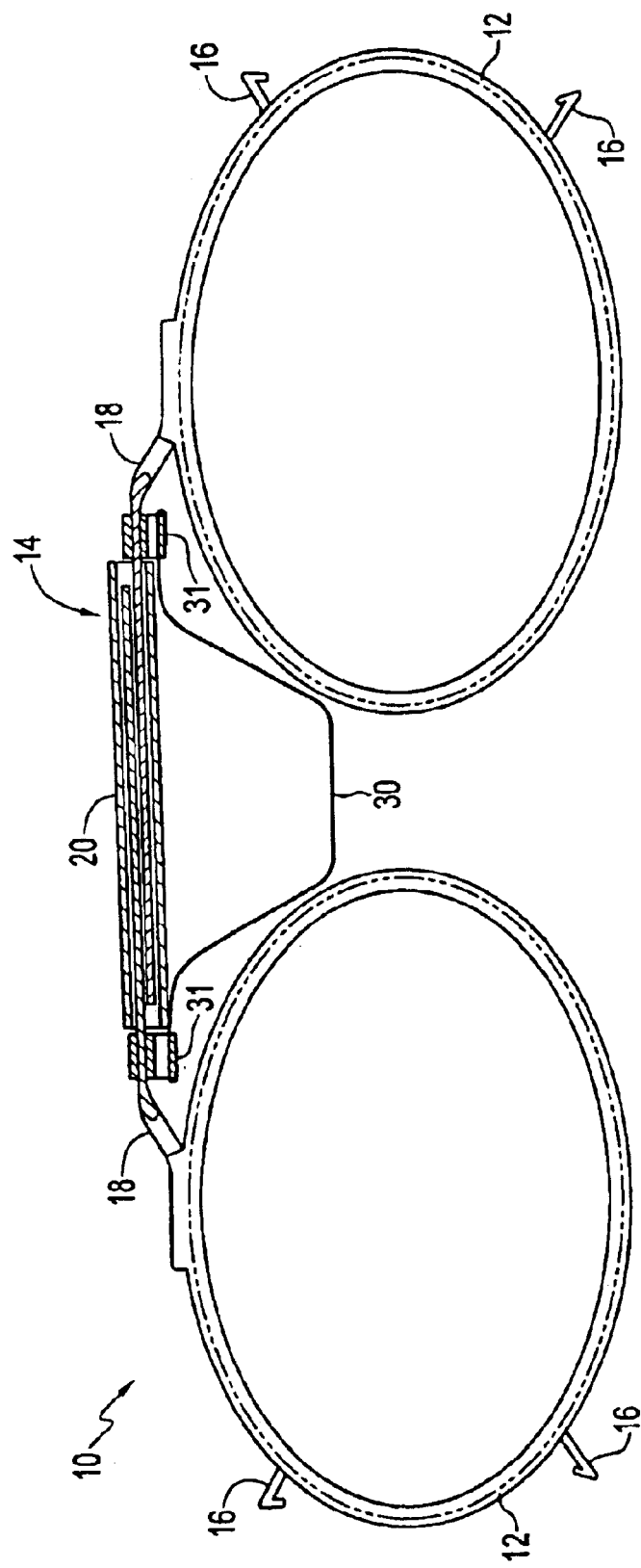
FIG. 6 is a partially sectional, front elevation view of a clip-on glasses assembly in a closed position, with an actuating mechanism according to a preferred embodiment of the invention; and, FIG. 7 is a partially sectional, front elevation view of the clip-on glasses assembly of FIG. 6 in an open position.
Figure 7:
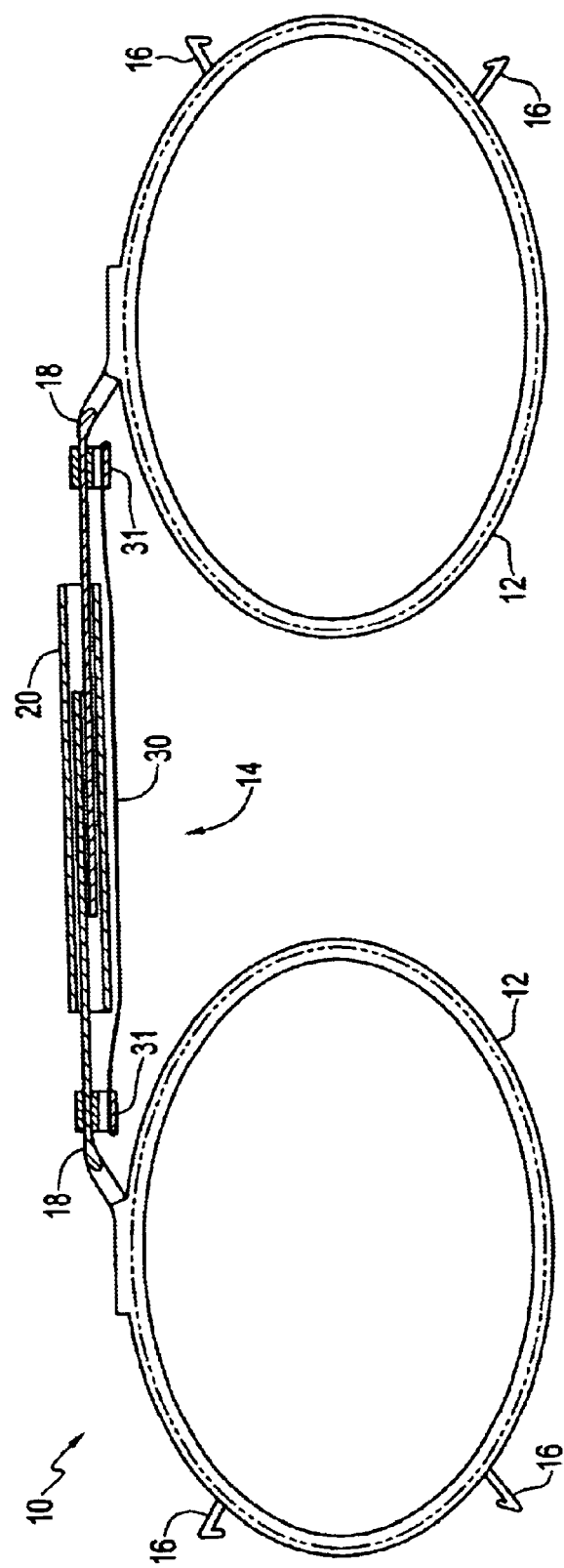

According to a preferred embodiment of the invention, as shown in FIGS. 6 and 7, an actuating mechanism in the form of an actuator bar 30 is attached to slider bars 18 to facilitate mounting and removal of glasses assembly 10. Preferably, actuator bar 30 is resilient in order to bias lens members 12 toward the closed position shown in FIG. 6 without the use of additional spring mechanisms such as springs 24. Actuator bar 30 is preferably constructed from a resilient material such as spring-tempered stainless steel or memory metal; however, any resilient material will work. Actuator bar 30 is preferably generally U-shaped, so that when actuator bar 30 is pressed toward housing 20, the ends 31 of actuator bar move apart as actuator bar 30 is flattened against housing 20, which in turn forces slider bars 18 to move outward and into the open position shown in FIG. 7. Actuator bar 30 preferably tends to return to the closed position shown in FIG. 6, such that in the absence of external forces exerted by the user, actuator bar 30 provides sufficient biasing force to return glasses assembly 10 to the closed position, even in the absence of springs 24. In the embodiment illustrated in FIGS. 1 to 3, and in the preferred embodiment of FIGS. 6 and 7, actuator bar 30 is illustrated as extending generally downwardly from bridge 14, but it is to be understood that actuator bar 30 could equally extend upwardly or outwardly from bridge 14 without altering the functioning of the invention. It is also understood that slider bars 18 can take any form, as long as they are slidable within housing 20; for example, they can slidingly overlap each other as shown in FIGS. 6 and 7, or remain completely separate from each other as shown in FIGS. 1 to 3.

FIG. 1 shows glasses assembly 10 in a closed position. Actuator bar 30 and/or springs 24 bias glasses assembly 10 into the closed position. A user may move glasses assembly 10 into an open position, as shown in FIG. 2, by squeezing housing 20 and actuator bar 30 together. Such an operation may typically be performed by the thumb and forefinger of one hand, leaving the user's other hand free.

Once glasses 10 are in the open position shown in FIG. 2, they may be placed over a pair of primary glasses (not shown). The user may then release actuator bar 30, allowing springs 24 and/or the resiliency of actuator bar 30 to move glasses assembly 10 back into the closed position.

When in the closed position, grapples 16 bear against the outer edges of the primary glasses (not shown). Grapples 16 hold glasses assembly 10 in fixed relation to the primary glasses (not shown) when glasses assembly 10 is mounted in the closed position. To remove glasses assembly 10, the user again squeezes actuator bar 30 and housing 20 together to move glasses assembly 10 into the open position, and then takes them off the primary glasses (not shown). The invention permits glasses assembly 10 to be easily mounted and removed from the primary glasses using only one hand.

Figure 4:
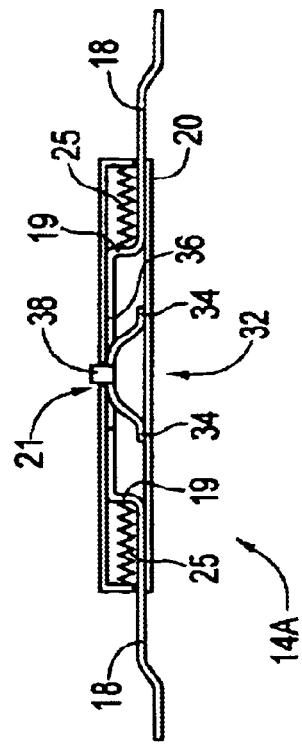
FIG. 4 is a sectional, front elevation view of the bridge of a clip-on glasses assembly in a closed position, with a locking feature according to an alternative embodiment of the invention.
Figure 5:
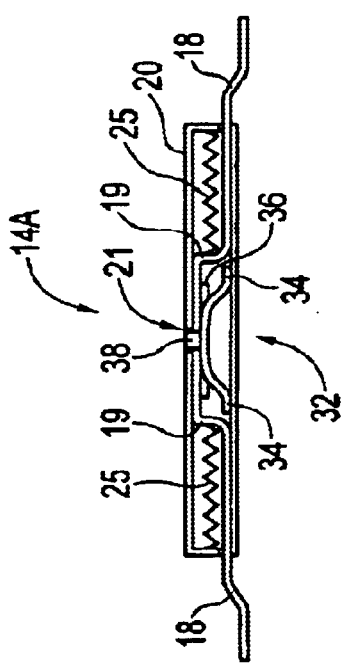
FIG. 5 is a sectional, front elevation view of the bridge of a clip-on glasses assembly of FIG. 4, in an open position.

In the embodiments of the invention illustrated in FIGS. 1 to 3 and 6 and 7, the glasses assembly remains in an open position for so long as the user continues to hold actuator bar 30 and housing 20 together. In an alternative embodiment, the actuating mechanism according to the present invention includes a locking feature, such that, after a user actuates the glasses assembly 10 into an open position, the locking feature automatically maintains the glasses assembly 10 in that open position. For example, FIGS. 4 and 5 illustrate an alternative embodiment of the invention wherein the locking feature is implemented in a bridge 14A having a locking mechanism 32. In this embodiment, slider bars 18 have bearing surfaces 19 against which compression springs 25 are compressed between the outer edges of housing 20 and bearing surfaces 19, so as to bias slider bars 18 towards locking mechanism 32. Locking mechanism 32 comprises biasing members in the form of leaf springs 34, a lock bar 36, and a push button 38. In the closed position, as shown in FIG. 4, slider bars 18 bear against push button 38. When glasses 10 are moved toward the open position, either by pulling lens members 12 apart or by squeezing housing 20 and actuator bar 30 (not shown in FIGS. 4 and 5) together, slider bars 18 move apart until the spacing between them is sufficient for lock bar 36 to fit interposed between them. Leaf springs 34 are configured to bias lock bar 36 toward and into the space between slider bars 18, so that when glasses assembly 10 is in the open position, lock bar 36 is flush against the wall of housing 20, and push button 38 extends through an appropriately sized aperture 21 in housing 20. Thus, slider bars 18 bear against lock bar 36, and glasses assembly 10 remains in the open position, even when the user releases actuator bar 30 (not shown in FIGS. 4 and 5) and housing 20, or lens members 12. To return the embodiment of FIGS. 4 and 5 to the closed position shown in FIG. 4, the user presses push button 38, thereby forcing lock bar 36 out of the space between slider bars 18 and allowing compression springs 25 to move slider bars 18 back into contact with push button 38.

Actuator bar 30 is not shown in FIGS. 4 and 5, but is optionally attached to slider bars 18 in the same manner as illustrated in FIGS. 1 to 3. In that way, the user can actuate glasses assembly 10 into an open position by squeezing actuator bar 30 and housing 20 together, rather than manually, at which point locking mechanism 32 will maintain glasses assembly 10 in that open position until push button 38 is pushed to release locking mechanism 32.

Prior art glasses assemblies such as those disclosed in U.S. Pat. No. 6,371,612 to Barrows, U.S. Pat. No. 6,234,628 to Friedman, and U.S. Pat. No. 5,710,614 to Cereda can easily be modified to affix an actuating mechanism in the form of actuator bar 30 of the present invention. For example, an actuating mechanism in the form of actuator bar 30 can be affixed to the lens members of any of those prior art glasses assemblies. Once affixed, it will no longer be necessary for a user to use both hands to move the lens members of those prior art glasses assemblies into an open position; by squeezing actuator bar 30 toward the bridge of those prior art glasses assemblies, the user can actuate those assemblies into an open position using only one hand.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A clip-on glasses assembly for mounting on primary glasses, the assembly comprising:
   (a) a pair of lens members;
   (b) at least one grapple on each of the pair of lens members for engaging the outer edges of the primary glasses;
   (c) a bridge coupled between the lens members, the bridge configured to slidably receive the lens members to allow movement of the lens members between an open position wherein a space between the grapples is large enough to allow the clip-on glasses to be mounted on and removed from the primary glasses, and a closed position wherein the space between the grapples is small enough to prevent the clip-on glasses from being mounted on or removed from the primary glasses;
   (d) means for biasing the lens members toward the closed position; and
   (e) an actuator bar having two ends, each end coupled to one of the lens members, whereby moving the actuator bar toward the bridge forces the ends of the actuator bar apart and moves the lens members into the open position.

2. The glasses assembly of claim 1 wherein the actuator bar is generally U-shaped.

3. The glasses assembly of claim 2 wherein the actuator bar is constructed from a resilient material, and itself comprises the means for biasing the lens members toward the closed position.

4. The glasses assembly of claim 1 wherein each lens member comprises a slider bar attached to the top thereof, and the bridge comprises a housing configured to slidably receive the slider bars at opposite ends thereof.

5. The glasses assembly of claim 4 wherein the means for biasing the lens members comprises a spring attached between each slider bar and a portion of the housing.

6. The glasses assembly of claim 5 wherein the bridge further comprises a locking mechanism for maintaining the lens members in the open position.

7. The glasses assembly of claim 6 wherein the locking mechanism comprises a lock bar and at least one biasing member configured to move the lock bar between the slider bars when the lens members are in the open position.

8. The glasses assembly of claim 7 wherein the locking mechanism further comprises a push button configured to extend through a correspondingly-sized aperture in the housing when the lock bar is between the slider bars.

9. A clip-on glasses assembly for mounting on primary glasses, the assembly comprising:
   (a) a pair of lens members;
   (b) at least one grapple on each of the pair of lens members for engaging the outer edges of the primary glasses;
   (c) a bridge coupled between the lens members, the bridge configured to slidably receive the lens members to allow movement of the lens members between an open position wherein a space between the grapples is large enough to allow the clip-on glasses to be mounted on and removed from the primary glasses, and a closed position wherein the space between the grapples is small enough to prevent the clip-on glasses from being mounted on or removed from the primary glasses;
   (d) means for biasing the lens members toward the closed position; and
   (e) a locking mechanism for maintaining the lens members in the open position.

10. The glasses assembly of claim 9, wherein each lens member comprises a slider bar attached to the top thereof, and the bridge comprises a housing configured to slidably receive the slider bars at opposite ends thereof.

11. The glasses assembly of claim 10 wherein the means for biasing the lens members comprises a spring attached between each slider bar and a portion of the housing.

12. The glasses assembly of claim 11 wherein the locking mechanism comprises a lock bar and at least one biasing member configured to move the lock bar between the slider bars when the lens members are in the open position.

13. The glasses assembly of claim 12 wherein the locking mechanism further comprises a push button configured to extend through a correspondingly-sized aperture in the housing when the lock bar is between the slider bars.

14. An actuating mechanism for a clip-on glasses assembly, said assembly having a pair of lens members and a bridge coupled between the lens members to slidably receive the lens members and allow movement of the lens members between an open position and a closed position, said actuating mechanism comprising an actuator bar having two ends, each end adapted for coupling to one of the lens members such that moving the actuator bar toward the bridge will force the ends of the actuator bar apart and move the lens members into the open position.

15. The actuating mechanism of claim 14 wherein the actuator bar is generally U-shaped.

16. The actuating mechanism of claim 15 wherein the actuator bar is constructed from a resilient material, and itself biases the lens members toward the closed position.

* * * * *